Patented June 7, 1932

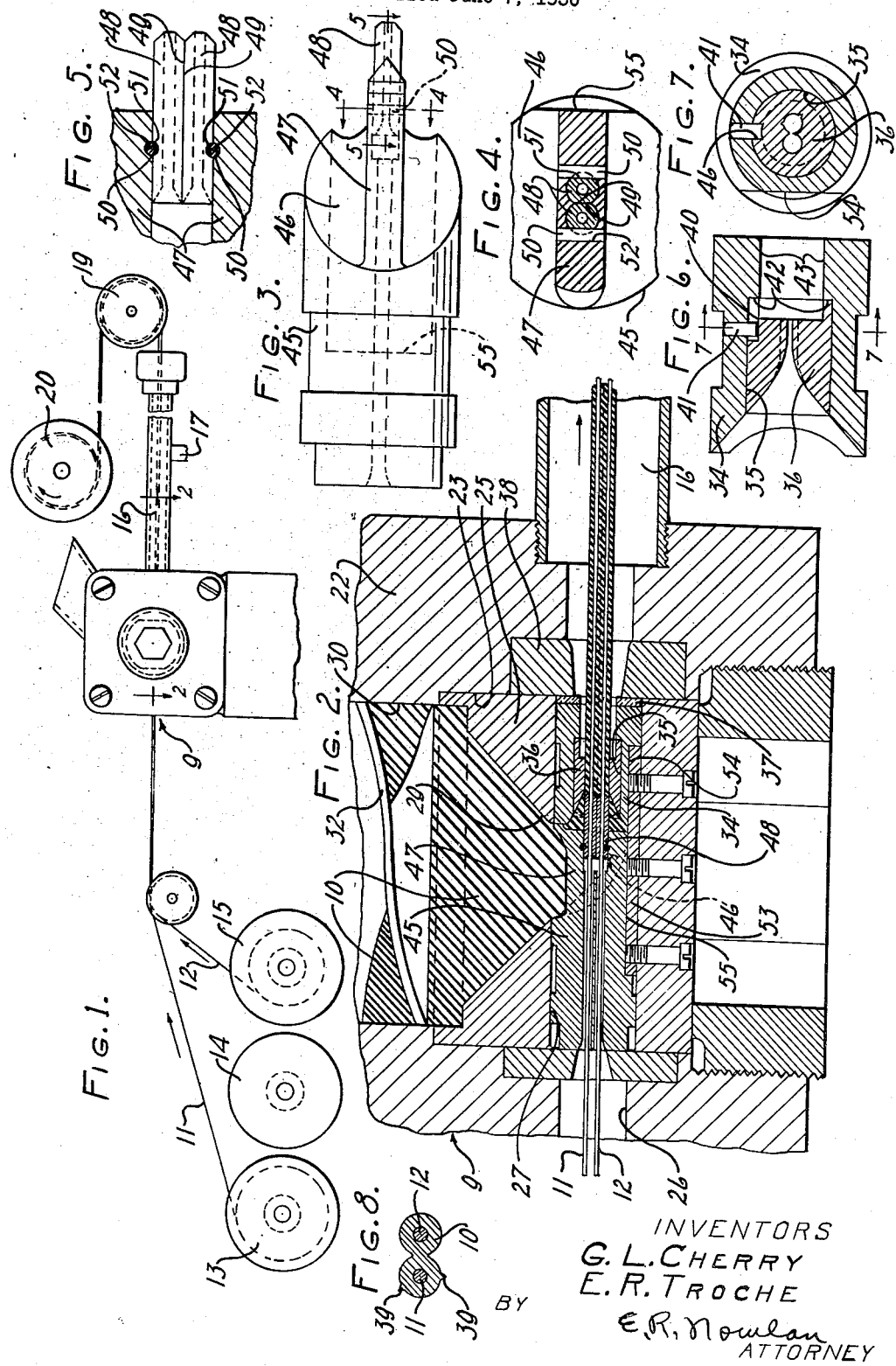

1,862,005

UNITED STATES PATENT OFFICE

GEORGE L. CHERRY, OF LA GRANGE, ILLINOIS, AND ERNEST R. TROCHE, OF BALTIMORE, MARYLAND, ASSIGNORS TO WESTERN ELECTRIC COMPANY, INCORPORATED, OF NEW YORK, N. Y., A CORPORATION OF NEW YORK

APPARATUS FOR SHEATHING CORES

Application filed June 7, 1930. Serial No. 459,650.

This invention relates to apparatus for sheathing cores, and more particularly to apparatus for continuously extruding a common covering upon a plurality of wires.

An object of the present invention is to provide a simple and improved apparatus for applying a uniform covering upon cores.

In accordance with one embodiment of the invention, there is provided in an apparatus for continuously applying a common covering of vulcanized rubber upon a pair of wires or conductors, an extrusion head for extruding the covering material upon the wires and a heated chamber for vulcanizing the covering. The extrusion head comprises a conveyor screw adapted to feed the covering material to the wires under pressure, an extrusion die designed to impart the desired configuration to the outer surface of the covering, and a pair of cooperating core tubes for guiding and centering the wires with respect to the die. The core tubes are formed with complementary flat sides and are secured in parallel relationship in a holder, with their flat sides interengaging, by means of pins engaging slots in the opposite sides of the core tubes. The die is longitudinally slidable in a tubular holder, but is restrained against rotation therein by means of a pin secured to the die holder and engaging a longitudinal slot in the outer surface of the die.

A more complete understanding of the invention will be had from the following detailed description, reference being had to the accompanying drawing, wherein Fig. 1 is a diagrammatic elevational view of one form of core sheathing apparatus embodying the features of the invention;

Fig. 2 is an enlarged fragmentary section on line 2—2 of Fig. 1;

Fig. 3 is a detail view of the core tube assembly;

Fig. 4 is an enlarged sectional view on line 4—4 of Fig. 3;

Fig. 5 is an enlarged fragmentary section on line 5—5 of Fig. 3;

Fig. 6 is an enlarged longitudinal section through the extrusion die and die holder;

Fig. 7 is a section on line 7—7 of Fig. 6; and

Fig. 8 is an enlarged sectional view of a pair of conductors, coated by the apparatus shown in Figs. 1 and 2.

Referring now to the drawing wherein like reference numerals designate corresponding parts throughout the several views, the reference numeral 9 designates the extrusion head of an apparatus adapted to continuously apply a common coating of rubber compound or other material 10 to wires 11 and 12 which pass therethrough from supply reels 13, 14 and 15, the supply reels being so mounted with respect to the extrusion machine that when one reel becomes exhausted the wire from another reel may be threaded into the machine without removing the exhausted reel. From the extrusion head, the coated wires are passed through an elongated chamber 16, wherein steam or other heating medium is admitted through an inlet 17, the heating medium being maintained under pressure in the chamber. From chamber 16 the coated and heat treated wires pass over a capstan 19 to a take-up reel 20. The capstan 19 is driven, by means not shown, at a predetermined speed which is coordinated with the extruding speed of the extrusion head 9.

The extrusion head 9 consists of a body portion 22 provided with a cylindrical bore 23 (Fig. 2) in which is mounted a head block 25, the body 22 and head block 25 being provided with aligned cylindrical bores 26 and 27, respectively. The bore 27 communicates through a tapered opening or mouth 29 with a cylindrical bore 30 in the body portion 22 in which a conveyor screw 32 operates to feed the covering material 10 to the wires 11 and 12 as they move through the head block 25.

Slidably mounted within the bore 27 of the head block 25, to the right of the mouth 29 (Fig. 2), is a cylindrical die holder 34 having a central cylindrical bore 35 for accommodating an extrusion die 36 designed to impart the desired ultimate configuration to the outer surface of the covering, which is preferably shaped to indicate polarity by means of longitudinally extending fins 39, as shown in Fig. 8. A gasket 37, preferably of asbestos fibre saturated with graphite, or soft copper, aluminum, or other suitable gasket material, is interposed between the end of the die holder 34 and an apertured plate 38 mounted in the body portion 22. A steam tight seal between the die holder and the chamber 16 is maintained during the extruding operation by reason of the die holder being pressed forwardly toward the plate 38 by the pressure of the coating material being forced through the bell-mouthed die and die holder by the conveyor screw 32.

The die 36 fits slidably in the die holder and is formed with a longitudinally extending external slot 40 which is engaged by an internally projecting pin 41 of the die holder 34, whereby the die is movable longitudinally with respect to the die holder, but is restrained against rotary movement therein. Also, this construction facilitates the removal and replacement of the die with respect to the holder. The pressure of the coating material forces the die forwardly against a shoulder 42 formed by a reduced portion 43 of the bore 35 in the die holder, which limits the forward movement of the die.

Mounted within the cylindrical bore 27 of the head block 25, to the left of the die 36, is a core tube assembly (Fig. 3) which consists of a cylindrical core tube holder 45 having an inclined, curved surface 46 for deflecting the coating material toward the die 36 and a central fin or partition 47 adapted to divide the coating material into two portions and thereby distribute it evenly upon the wires. Mounted within the holder 45 and extending forwardly therefrom into the mouth of the die 36 are a pair of core tubes 48—48 which serve to guide the wires and accurately center them with respect to the die. The core tubes are provided with complementary flat sides 49—49 and are secured in parallel relationship within the holder 45 with their flat sides interengaging, by means of pins 50—50 engaging transverse semi-circular slots 51—51 in the opposite sides of the core tubes and complementary semi-circular slots 52—52 in the bore of the holder.

The die and core tube assemblies are maintained in alignment with respect to each other by means of an aligning plate or key member 53 secured within the bore of the head block 25 and adapted to engage cooperating slots 54 and 55 provided in the outer surfaces of the die and core tube holders 34 and 45, respectively. It will be understood that the plate 53 prevents turning of the die and core tube assemblies within the head block and also limits their movement toward each other.

While the invention has been described with particular reference to an apparatus for extruding and vulcanizing a common covering upon a pair of wires, it will be readily understood that it may be applied with suitable modifications to apparatus for sheathing a single wire as well as more than two wires, and that it may be applied to apparatus for sheathing cores with material other than rubber. The scope of the invention is therefore to be limited only by the terms of the following claims.

What is claimed is:

1. In an apparatus for applying a common covering upon a plurality of cores, means for applying a plastic covering material to the cores, a die for imparting the desired ultimate configuration to the outer surface of the covering, and a plurality of core centering tubes cooperating with the die provided with complementary plane surfaces extending longitudinally thereof to prevent said cores from rotating about their longitudinal axes.

2. In an apparatus for sheathing cores, means for applying a plastic covering material to a core, a die for imparting the desired ultimate configuration to the outer surface of the covering, a core tube for centering the core with respect to the die, said core tube having a flat side and a transverse slot in its opposite side, a tubular holder for the core tube having an internal transverse slot cooperating with the slot in the core tube, and a pin engaging the slots in the tube and holder for securing the tube to the holder.

3. In an apparatus for applying a common covering upon a plurality of cores, means for applying a plastic covering material to the cores, a die for imparting the desired ultimate configuration to the outer surface of the covering, a plurality of core centering tubes cooperating with the die and having complementary flat sides and transverse slots in their opposite sides, a holder for the core tubes, and means engaging the slots in the core tubes for securing the tubes in parallel relationship within the holder with their flat sides interengaging.

4. In an apparatus for applying a common covering upon a plurality of cores, means for applying a plastic covering material to the cores, a die for imparting the desired ultimate configuration to the outer surface of the covering and having a longitudinal external slot, a support for the die, a pin secured to the support and engaging the slot in the die for permitting longitudinal movement and preventing rotary movement of the die with respect to the support, a plurality of core centering tubes cooperating with the die and having complementary flat sides and transverse grooves in their opposite sides, a holder for the core tubes having transverse slots cooperating with the slots in the core tubes, and pins engaging the slots in the core tubes and holder for securing the tubes in parallel relationship within the holder with their flat sides interengaging.

5. In an apparatus for sheathing cores, means for applying a plastic covering material to a core, a head block, a die for imparting the desired ultimate configuration to the outer surface of the covering within said head block, a core tube for centering the core with respect to the die, a tubular holder for the core tube within said head block, and aligning means within said head block for maintaining said die and tubular holder in alignment with respect to each other.

6. In an apparatus for sheathing cores, means for applying a plastic covering material to a core, a head block, a die for imparting the desired ultimate configuration to the outer surface of the covering within said head block, a core tube for centering the core with respect to the die, a tubular holder for the core tube within said head block, said die and tubular holders having longitudinal slots and a key in said head block extending into said slots for maintaining said die and tubular holder in alignment with respect to each other.

In witness whereof we hereunto subscribe our names this 19th day of May A. D., 1930, and this 27 day of May A. D. 1930, respectively.

GEORGE L. CHERRY.
ERNEST R. TROCHE.